(12) United States Patent  (10) Patent No.: US 6,374,500 B2
Stein et al.  (45) Date of Patent: Apr. 23, 2002

(54) COLLAPSIBLE BARBECUE TOOLS

(75) Inventors: Douglas W. Stein, Chicago, IL (US); Bruce E. Ancona, New York, NY (US); Daniel Winigrad, Jersey City, NJ (US)

(73) Assignee: World Kitchen, Inc., Elmira, NY (US)

( * ) Notice: Subject to any disclaimer, the term of this patent is extended or adjusted under 35 U.S.C. 154(b) by 0 days.

(21) Appl. No.: 09/847,267

(22) Filed: May 2, 2001

Related U.S. Application Data

(63) Continuation of application No. 09/729,603, filed on Dec. 4, 2000, which is a continuation of application No. 09/524,316, filed on Mar. 13, 2000, now Pat. No. 6,170,161.

(51) Int. Cl.[7] .................................................. A47J 43/28
(52) U.S. Cl. .......................... 30/342; 30/160; 30/322; 30/324
(58) Field of Search ........................... 30/162, 322–328, 30/342, 163, 339; 16/115

(56) References Cited

U.S. PATENT DOCUMENTS

| | | |
|---|---|---|
| 307,767 A | 11/1884 | Heysinger |
| 472,104 A | 4/1892 | Von Bultzingslowen |
| 719,208 A | 1/1903 | Garda |
| 1,030,592 A | 6/1912 | Leland |
| 1,269,413 A | 6/1918 | Finnigan |
| 1,484,379 A | 2/1924 | Rainey |
| 1,753,441 A | 4/1930 | Morehouse |
| 1,768,425 A | 6/1930 | Smith |
| 2,178,971 A | 11/1939 | Sax |
| 2,818,290 A | 12/1957 | Harocopo |
| 3,306,639 A | 2/1967 | Lyon |
| 3,889,368 A | 6/1975 | Himeno |
| 3,906,632 A | 9/1975 | Oppenheimer |
| 4,043,067 A | 8/1977 | Konucik et al. |
| 4,406,559 A | 9/1983 | Geertsema et al. |
| 4,409,866 A | 10/1983 | McBride |
| 4,512,381 A | 4/1985 | Alvarez |
| 4,646,440 A | 3/1987 | Decker |
| 4,733,882 A | * 3/1988 | Kassai .................... 403/108 X |
| D311,307 S | 10/1990 | Cautereels et al. |
| 5,099,724 A | 3/1992 | Reddy, Jr. |
| 5,206,998 A | * 5/1993 | Oriente et al. ................. 30/142 |
| 5,220,707 A | 6/1993 | Newman, Sr. et al. |
| D347,975 S | 6/1994 | Zeller |
| D391,760 S | 3/1998 | Zeller |
| D392,846 S | 3/1998 | Zeller |
| D392,848 S | 3/1998 | Zeller |
| D392,849 S | 3/1998 | Zeller |
| D392,850 S | 3/1998 | Zeller |
| D392,851 S | 3/1998 | Zeller |
| 5,729,865 A | 3/1998 | Stoddart |
| D393,570 S | 4/1998 | Zeller |

FOREIGN PATENT DOCUMENTS

| | | |
|---|---|---|
| JP | 61-188540 | 11/1986 |
| JP | 62-90583 | 6/1987 |

* cited by examiner

*Primary Examiner*—Douglas D. Watts
(74) *Attorney, Agent, or Firm*—Wolf, Greenfield & Sacks, P.C.

(57) ABSTRACT

A collapsible barbecue tool assembly includes a barbecue tool, a handle and a latch mechanism mounted in the handle. The handle includes an elongated cavity for slidably receiving a blade portion of the barbecue tool. The blade portion of the tool has one or more locating elements. The latch mechanism releasably engages one of the locating elements so that the tool is movable to and between a collapsed position and an extended position.

6 Claims, 4 Drawing Sheets

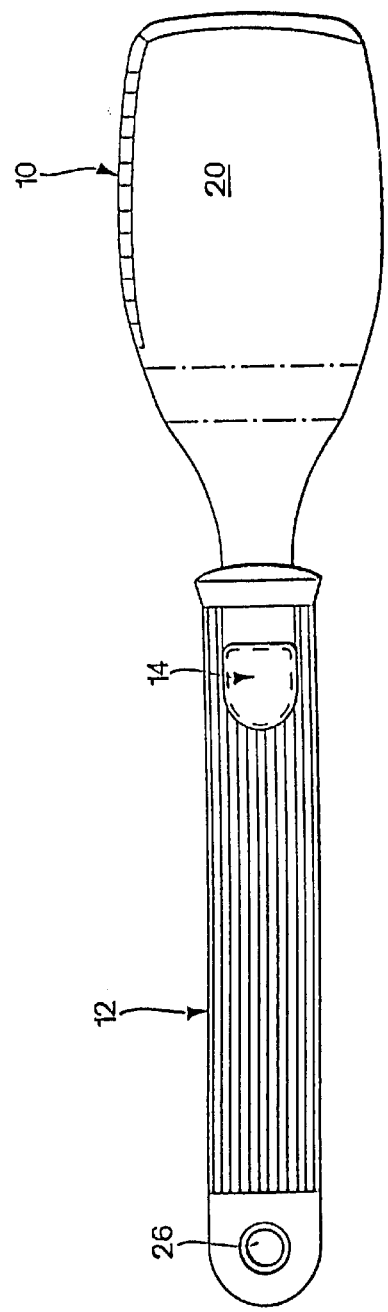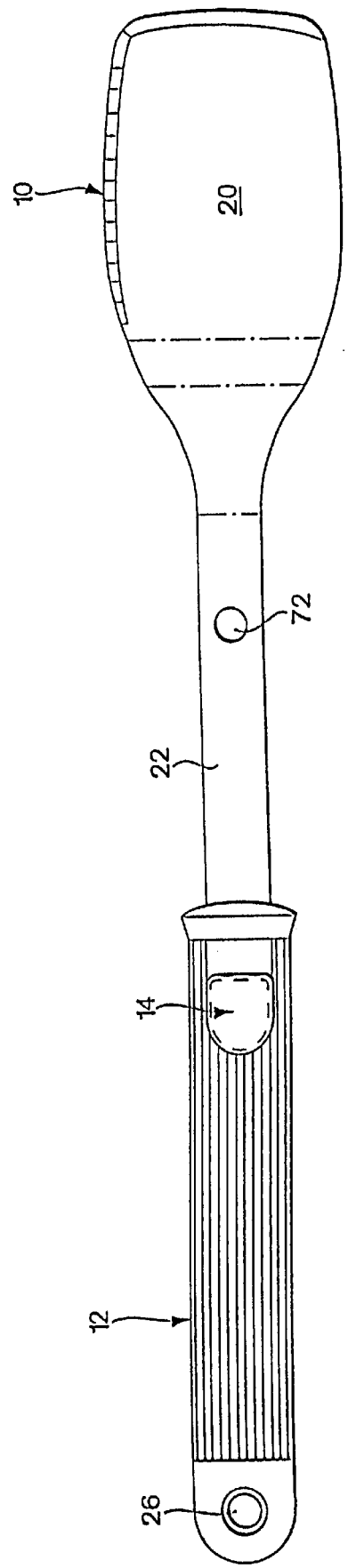

COLLAPSIBLE BARBECUE TOOLS

RELATED APPLICATION

This application is a continuation of application Ser. No. 09/729,603 filed Dec. 4, 2000, currently pending, which in turn is a continuation of application Ser. No. 09/524,316, filed Mar. 13, 2000, now U.S. Pat. No. 6,170,161.

FIELD OF THE INVENTION

This invention relates to cooking utensils and, more particularly, to barbecue utensils that are collapsible between an extended position and a collapsed position.

BACKGROUND OF THE INVENTION

Barbecue tools, or utensils, are those which are commonly used with gas and charcoal grills. These tools commonly have long handles to reduce the possibility that the user will be burned by the open flame and high heat of the barbecue grill. However, long-handled barbecue tools are difficult to store in the space normally used for storage of kitchen utensils because of their length. Furthermore, long-handled barbecue tools may not easily fit in a dishwasher. Finally, long-handled barbecue tools may be difficult to use because of their length, particularly when used with a small barbecue grill or when used in a small space.

It is desirable to provide barbecue tools which have the safety features of long-handled barbecue tools, but which are easy to store and which can easily fit into a dishwasher.

SUMMARY OF THE INVENTION

According to the present invention, a collapsible cooking tool assembly is provided. The cooking tool assembly comprises a cooking tool having a head and a handle-engaging portion. The handle-engaging portion has at least two locating elements. The cooking tool assembly further comprises a handle having a cavity for receiving the handle-engaging portion of the cooking tool and a latch mechanism mounted in the handle for releasably engaging one of the locating elements. The cooking tool is movable relative to the handle to and between a collapsed position and an extended position.

The cooking tool is preferably a barbecue tool. The head may comprise a turner, a fork, tongs, a basting brush, or any other desired head.

The handle-engaging portion may comprise a flat blade or strip, and the locating elements may comprise openings in the blade. The latch mechanism may comprise a spring-loaded button having a latch element for engaging one of the openings, and a resilient button cover. The button is manually depressed to release the latch element from the opening in the blade, so that the cooking tool is movable between the collapsed position and the extended position, or vice versa.

BRIEF DESCRIPTION OF THE DRAWINGS

For a better understanding of the present invention, reference is made to the accompanying drawings, which are incorporated herein by reference and in which:

FIG. 1 is a top view of a collapsible cooking tool assembly in accordance with the invention, shown in the collapsed position;

FIG. 2 is a top view of the collapsible cooking tool assembly of FIG. 1, shown in the extended position;

DETAILED DESCRIPTION

Figure 3:
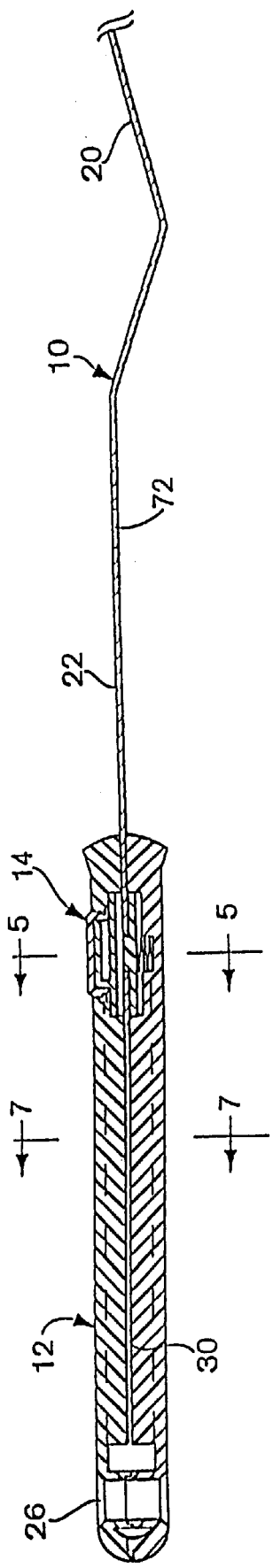
FIG. 3 is a cross-sectional view of the collapsible cooking tool assembly, shown in the extended position.
Figure 4:
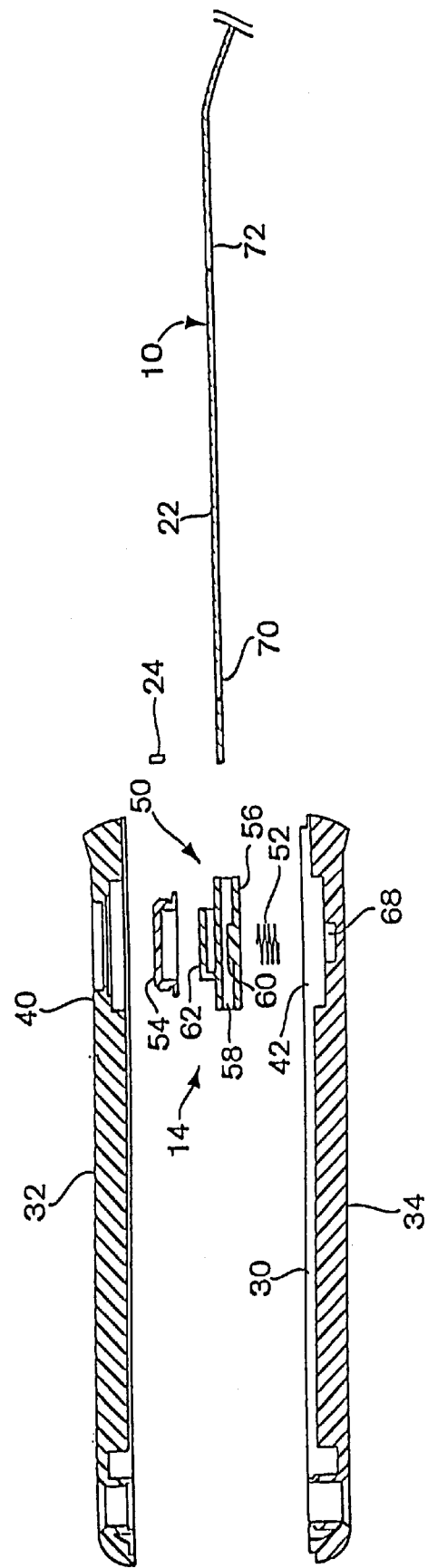
FIG. 4 is an exploded cross-sectional view of the collapsible cooking tool assembly.

An example of a collapsible cooking tool assembly in accordance with the invention is shown in FIGS. 1–7. The cooking tool assembly includes a cooking tool 10, a handle 12, and a latch mechanism 14. The cooking tool 10 is movable relative to handle 12 to and between a collapsed position shown in FIG. 1 and an extended position shown in FIG. 2. The cooking tool 10 locks in both the collapsed position, and in the extended position and is released from each position by manual actuation of the latch mechanism.

The cooking tool 10 includes a head 20, which in the illustrated example is a turner, attached to a handle-engaging portion 22. The head 20 may be a turner, as shown, a fork, tongs, a basting brush, or any other desired head. The handle-engaging portion 22 may be a thin, flat blade or strip that slidably extends into handle 12 as described below. Preferably, the cooking tool 10 has a single-piece metallic construction and may be fabricated of stainless steel.

Figures 5, 6, 7:
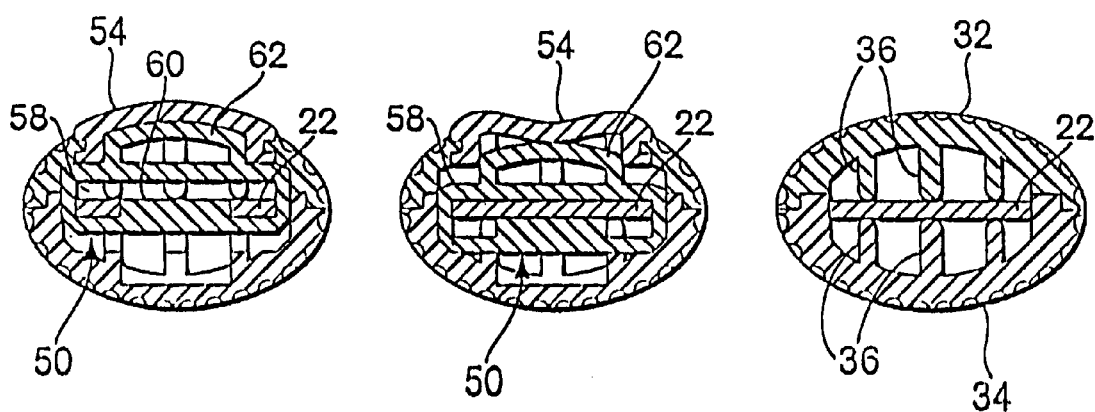
FIG. 5 is a cross-sectional view of the handle and latch mechanism, taken along the line 5—5 of FIG. 3.
FIG. 6 is a cross-sectional view of the handle and latch mechanism, shown with the button depressed.
FIG. 7 is a cross-sectional view of the collapsible cooking tool assembly, taken along the line 7—7 of FIG. 3.

The handle 12 has an elongated configuration and defines a cavity 30 for slidably receiving the blade portion 22 of tool 10. The handle 12 may be formed as an upper section 32 and a lower section 34 which are attached together in the completed assembly. The handle sections 32 and 34 may be formed with internal support ribs 36, as best shown in FIG. 7, which support the blade portion 22 of tool 10 between them. The upper section 32 is provided with an opening 40, and the lower section 34 is provided with an opening 42. The openings 40 and 42 permit mounting of latch mechanism 14. The cavity 30 is formed as an elongated slot and preferably extends through the major portion of the length of handle 12. Preferably, the cavity 30 is just slightly larger than blade portion 22, so that tool 10 is securely supported in both the collapsed and extended positions. The handle may be fabricated of a rigid material with low thermal conductivity, such as ABS plastic. The handle 12 may include a hole 26 for hanging the tool.

As best shown in FIGS. 4–7, latch mechanism 14 includes a button 50, a spring 52, and a button cover 54. (The spring 52 is omitted from FIGS. 5 and 6). The button 50 is formed of a rigid material such as ABS plastic and includes a shell 56 defining a passage 58 for blade portion 22. A latch element 60 projects upwardly into passage 58. An upward projection 62 on button 50 contacts cover 54. The cover 54 is fabricated of a resilient material, such as rubber. The spring 52 is mounted in a recess 68 in the lower section 34 of handle 12.

The latch mechanism 14 operates as follows. The blade portion 22 of cooking tool 10 is provided with at least two locating elements, such as openings 70 and 72, which define the collapsed and extended positions of cooking tool 10 relative to handle 12. In a latched position in which button 62 of latch mechanism 14 is not depressed, the spring 52 urges latch element 60 upwardly into opening 70 or 72 in blade portion 22, thereby locking the blade portion 22 relative to handle 12. To change from one position to the other, the latch mechanism 14 is activated to a released position by manually depressing button cover 54 so that spring 52 is depressed and latch element 60 is disengaged from opening 70 or 72. In this position, the cooking tool 10 is released, and can be moved from the collapsed position to the extended position or from the extended position to the collapsed position. In particular, cooking tool 10 is moved lengthwise into or out of cavity 30 in handle 12. Upon release of latch mechanism 14 by the user, spring 52 urges latch element 60 into engagement with the appropriate opening 70 or 72 and latches cooking tool 10 in the desired position. It will be understood that additional positions can be provided by forming additional openings in blade portion 22. A pin 24 may be secured in blade portion 22 to prevent cooking tool 10 from being entirely removed from handle 12.

It will be understood that any desired head can be used on the cooking tool. Furthermore, different latching mechanisms and different locating elements on blade portion 22 may be utilized within the scope of the invention.

While there have been shown and described what are at present considered the preferred embodiments of the present invention, it will be obvious to those skilled in the art that various changes and modifications may be made therein without departing from the scope of the invention as defined by the appended claims.

What is claimed is:

1. An extendable barbecue tool comprising:
    a cooking tool including a head portion and a handle-engaging portion, the handle-engaging portion having a top surface, a bottom surface and opposing sides;
    a handle having a cavity that slidably receives the handle-engaging portion of the cooking tool, the cooking tool slidable within the cavity to and between a collapsed position and an extended position;
    a locating element within the handle-engaging portion of the cooking tool;
    a latch mechanism, operatively connected to the handle, including a latch element and a button within the handle, wherein the latch element is of a shape that permits it to be located within the locating element;
    the latch element is spring biased toward a surface of the handle-engaging portion of the cooking tool such that the latch element, when aligned with the locating element, is releasably secured within the locating element to releasably secure the cooking tool in its extended position; and
    wherein the button is operatively coupled to the locating element such that when the button is depressed, the latch element is urged against the spring bias to release the latch element from the locating element enabling the cooking tool to move from its extended position.

2. The barbecue tool as claimed in claim 1 wherein the handle also has a top surface and a bottom surface consistent respectively with the top and bottom surfaces of the handle-engaging portion of the cooking tool, and wherein the button is depressible from the top surface of the handle.

3. The barbecue tool as claimed in claim 1 further including a second locating element within the handle-engaging portion of the cooking tool, the second locating element being spaced from the locating element along the longitudinal length of the handle-engaging portion of the cooking tool, such that when the latch element is releasably urged into the second locating element the cooking tool is releasably secured in its collapsed position.

4. The barbecue tool as claimed in claim 1 wherein the locating element includes an opening that extends from the top surface fully through to the bottom surface, and is spaced a distance from each of, and located between the opposing sides of the handle-engaging portion.

5. The barbecue tool as claimed in claim 4 wherein the latch element releasably extends fully through the opening when the cooking tool is in its extended position.

6. The barbecue tool as claimed in claim 3 wherein each of the locating elements includes an opening that extends from the top surface fully through to the bottom surface, and is spaced a distance from each of, and located between, the opposing sides of the handle-engaging portion.

\* \* \* \* \*